US008797376B2

(12) United States Patent
Saleh et al.

(10) Patent No.: US 8,797,376 B2
(45) Date of Patent: Aug. 5, 2014

(54) VIDEOCONFERENCING SYSTEM WITH ENHANCED TELEPRESENCE USING A SINGLE WIDE ASPECT RATIO CAMERA

(75) Inventors: Youssef Saleh, Arlington, MA (US); Gopal Paripally, North Andover, MA (US); Mark Duckworth, Merrimack, NH (US)

(73) Assignee: Polycom, Inc., San Jose, CA (US)

( * ) Notice: Subject to any disclaimer, the term of this patent is extended or adjusted under 35 U.S.C. 154(b) by 437 days.

(21) Appl. No.: 13/117,513

(22) Filed: May 27, 2011
(Under 37 CFR 1.47)

(65) Prior Publication Data
US 2011/0310214 A1  Dec. 22, 2011

Related U.S. Application Data

(60) Provisional application No. 61/349,609, filed on May 28, 2010.

(51) Int. Cl.
*H04N 7/14* (2006.01)
(52) U.S. Cl.
USPC .................. 348/14.07; 348/14.01; 348/14.08; 348/14.12; 348/14.16
(58) Field of Classification Search
USPC .......... 348/14.01, 14.02, 14.03, 14.04, 14.05, 348/14.06, 14.07, 14.08, 14.09, 14.1, 14.11, 348/14.12, 14.13, 14.14, 15.15, 14.16
See application file for complete search history.

(56) References Cited

U.S. PATENT DOCUMENTS

| 5,619,424 | A | * | 4/1997 | Cookson et al. | 348/14.14 |
| 5,793,415 | A | * | 8/1998 | Gregory et al. | 348/14.1 |
| 6,771,888 | B1 | * | 8/2004 | Cookson et al. | 386/232 |
| 8,464,025 | B2 | * | 6/2013 | Yamaguchi et al. | 712/22 |
| 2004/0003062 | A1 | * | 1/2004 | Sharma et al. | 709/220 |
| 2004/0257432 | A1 | * | 12/2004 | Girish et al. | 348/14.08 |
| 2005/0259144 | A1 | * | 11/2005 | Eshkoli | 348/14.07 |
| 2006/0224730 | A1 | * | 10/2006 | Fok et al. | 709/224 |
| 2011/0115876 | A1 | * | 5/2011 | Khot et al. | 348/14.09 |
| 2011/0211036 | A1 | * | 9/2011 | Tran | 348/14.08 |

* cited by examiner

Primary Examiner — Khai N Nguyen
(74) Attorney, Agent, or Firm — Wong, Cabello, Lutsch, Rutherford & Brucculeri, L.L.P.

(57) ABSTRACT

A videoconferencing system for enhanced telepresence employs a single wide aspect ratio high resolution camera for capturing video images of near end conference participants. Captured video image can be divided into adjacent portions, where video images corresponding to each portion is separately encoded and sent to a far end videoconferencing system to be displayed on adjacently placed display devices. Misalignment in displayed images at the far end can be mitigated by selecting portions that are non-overlapping and horizontally aligned. Number and size of the portions can be determined based on configuration information of the far end videoconferencing system.

28 Claims, 10 Drawing Sheets

VIDEOCONFERENCING SYSTEM WITH ENHANCED TELEPRESENCE USING A SINGLE WIDE ASPECT RATIO CAMERA

CROSS REFERENCE TO RELATED APPLICATIONS

This application claims benefit of U.S. Provisional Application No. 61/349,609, filed May 28, 2010, entitled "Videoconferencing System With Enhanced Telepresence Using a Single Wide Aspect Ratio Camera," which is hereby incorporated by reference in its entirety.

FIELD OF THE INVENTION

The present invention relates generally to videoconferencing systems, and more particularly enhanced telepresence systems.

BACKGROUND

Traditional telepresence implementations utilize multiple cameras for capturing all the participants in the near end conference room. Each camera captures only a portion of the conference room. Images captured by each camera are, typically, given to a codec for compression. The compressed images are transmitted to the far end conference room, where they are decompressed and displayed on one or more display screens. Because each near end camera captures only a portion of the near end conference room, the far end combines the images corresponding to each of the near end cameras by displaying the images on display screens placed adjacent to each other. The adjacently displayed images appear as a single seamless composite image to the far end participants.

Typically, multiple cameras are mounted on fixed camera mounts that point the cameras in a fixed direction. The orientation of the camera mounts is precisely arranged so that the images captured by each of the multiple cameras, when displayed on adjacent display screens at the far end, accurately align with each other. Therefore, when the far end combines the images received from the near end cameras, these images seamlessly combine to appear as a single image to the far end participants. However, over time, the orientation of the camera mounts can change due to vibrations, expansion/contraction of the mount components due to temperature changes, physical contact by conference participants, etc. A change in the orientation of a camera mount directly affects the orientation of the camera, which, in turn alters the portion of the conference room captured by that camera. Consequently, when the images from multiple cameras with altered orientation are combined at the far end, the seamlessness in the combined image can be lost.

For example, FIG. 1 shows four adjacently placed display screens 152, 154, 156, and 158 at a far end conference room 102 displaying images 104, 106, 108, and 110 received from four near end cameras (not shown). The effect of change in camera orientation can be seen at the boundaries of adjacent images. For example, boundary 112 between images 104 and 106 shows misalignment in display of objects that transition from images 104 to image 106. Similarly, misalignment can be seen at boundary 114 (between images 106 and 108) and at boundary 116 (between images 108 and 110). FIG. 2 shows a closer view of the misalignment between adjacent images 204 and 206 in composite image 202. Objects 208 and 210 in images 204 and 206, respectively, represent the same desk at the near end. However, they show up misaligned in the composite image. Misaligned objects, such as the ones shown in FIGS. 1 and 2, can be very distracting to far end conference participants viewing the composite image. The situation is even more bothersome when the boundary between two misaligned images passes over an image of a conference participant.

In addition to alignment, other camera parameters such as camera focus, lens settings, camera gain, noise levels, etc. may also differ between cameras over time. These differences in camera parameters manifest themselves as differences in color, contrast, brightness, etc. between adjacent images reproduced at the far end display screens. Thus, far end participant will not see a desired seamless composite image.

SUMMARY

A videoconferencing system is disclosed that employs a single wide aspect ratio high resolution camera to capture video images of near end participants. The camera can include image sensors having aspect ratios of 64:9 and higher. The camera can also include a wide angle lens for a large field of view of 100 degrees or more. Resolution of the video image produced by the camera can be 1080×(4×1920) and higher. The video image can be received by a videoconferencing unit for processing and transmission.

The videoconferencing unit can include a plurality of codecs, each of which can receive the full frame video image produced by the camera. The videoconferencing unit can also include a controller, which can control camera functions and configures the codecs as required. The controller can determine a number and size of adjacent, non-overlapping, and aligned portions of the full frame video image received from the camera. Each of these adjacent portions can be encoded by one of the plurality of codecs to generate a separate data stream. These separate data streams can be transmitted to the far end to be displayed on adjacent display devices. Because the adjacent portions of the full frame image are aligned with respect to each other, this alignment is advantageously maintained in the composite image produced at the far end on adjacent display devices. Additionally, the alignment is not affected by changes in orientation of the camera mount. Because the portions captured by the controller are from the same camera, the resulting adjacent images displayed at the far end can have uniform color, contrast, brightness, etc. The resulting composite image enhances telepresence experience for far end participants.

The number of portions, and the corresponding codecs, selected by the controller can be predetermined or can be based on configuration information of the far end. The controller can select and configure codecs based on far end configuration information. For example, the number of portions and the number of corresponding codecs can be equal to the number of display devices at the far end. The aspect ratio of the portions can also be selected based on the aspect ratio of the far end display devices.

The controller can also control camera properties such as pan, zoom, and tilt, to encompass a required number of near end participants within the selected portions of the full frame video image received from the camera. The controller can employ face recognition to determine the locations of images of near end participants within the video image.

BRIEF DESCRIPTION OF THE DRAWINGS

Exemplary embodiments of the present invention will be more readily understood from reading the following description and by reference to the accompanying drawings, in which.

DETAILED DESCRIPTION

Figure 1:
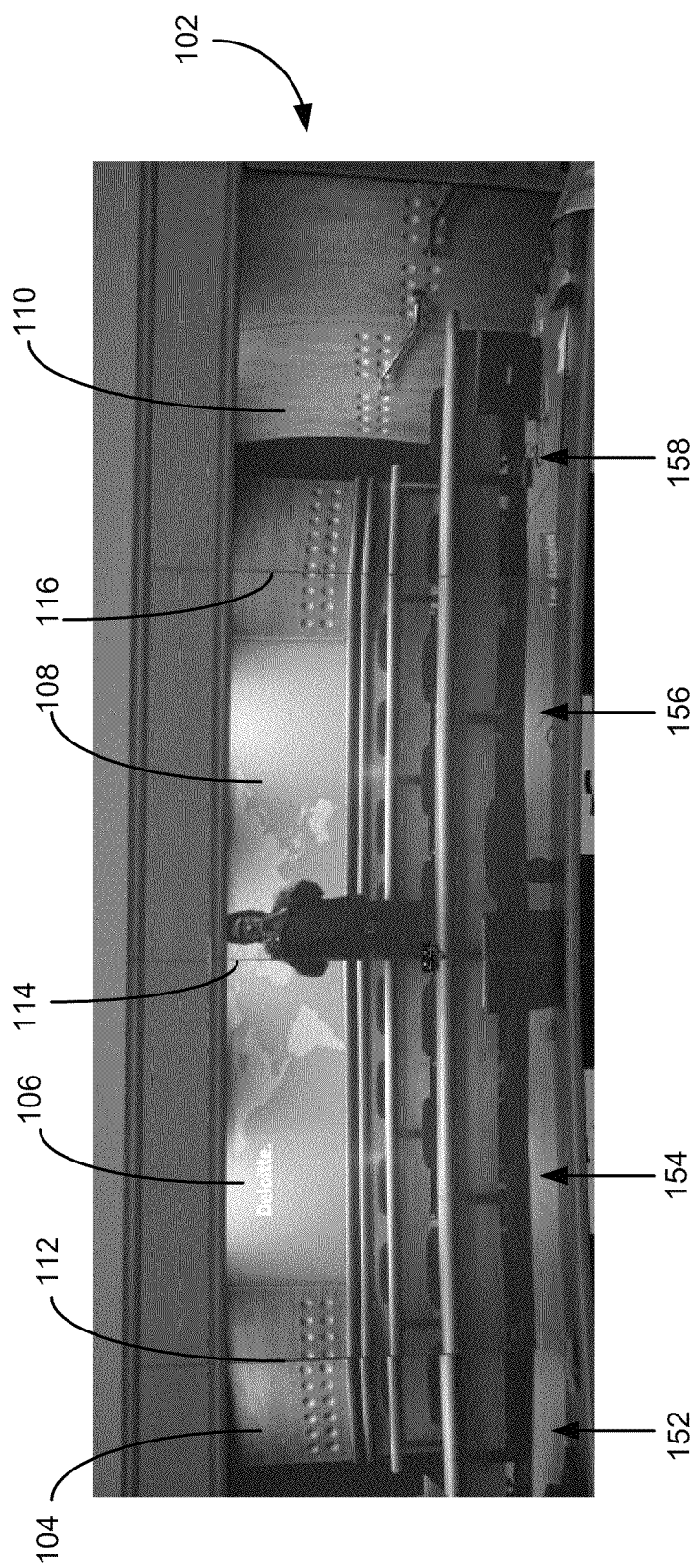
FIG. 1 illustrates misalignment in the far end image in a traditional videoconferencing system.
Figure 2:
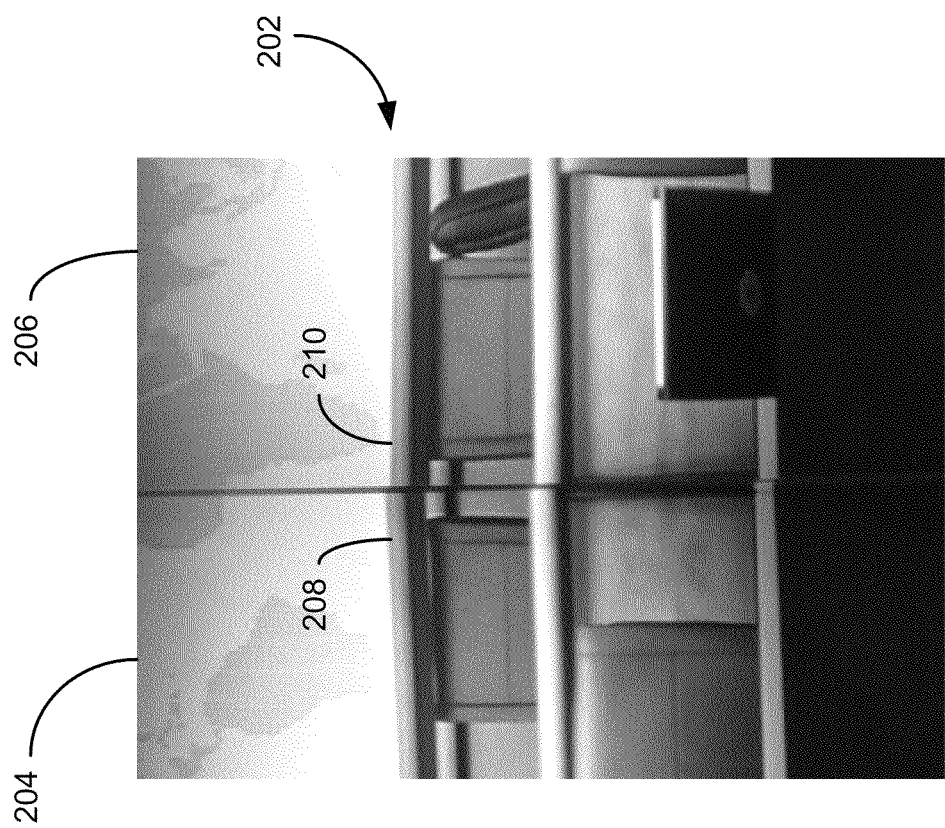
FIG. 2 shows the effect of misaligned adjacent images on objects that transition from one adjacent image to another.
Figure 3:
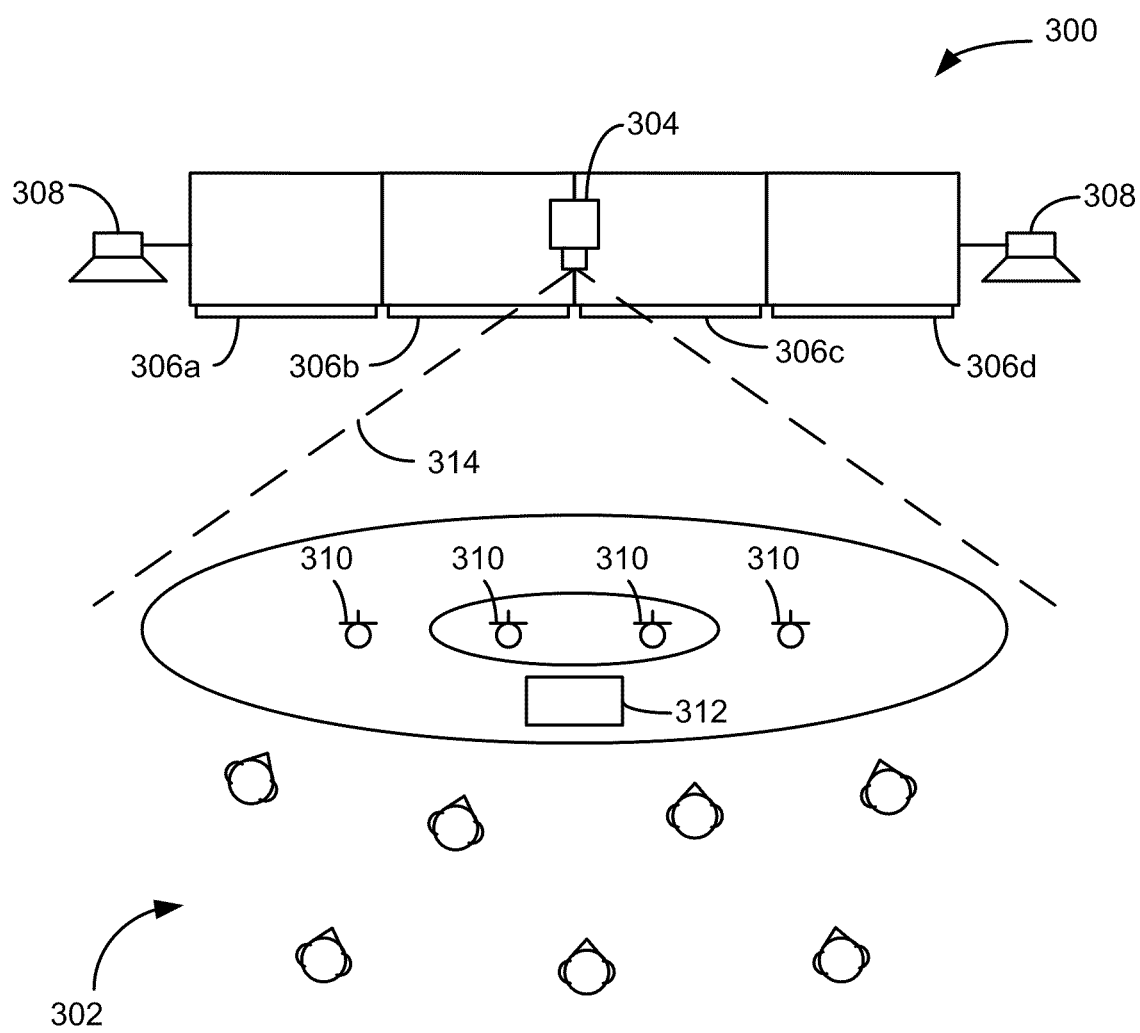
FIG. 3 illustrates an exemplary videoconferencing system.

FIG. 3 shows an example of a near end videoconferencing system 300 that allows participants 302 to carry out videoconferencing with far end participants. System 300 includes an image capturing device, such as camera 304, for capturing images of near end participants 302, microphones 310 for capturing voice and sound of participants 302, display screens 306a, 306b, 306c, and 306d for displaying images of far end participants received from far end videoconferencing system, loudspeakers 308 for reproducing voice and sound signals of far end participants, and a user interface 312 for receiving control input from participants 302 directed to initiating and managing the video conference. A videoconferencing unit (discussed below) can control and communicate with all components within the conferencing system 300 using wired and/or wireless serial or parallel communications. For example, the videoconferencing unit can communicate with the camera using serial USB link. The videoconferencing unit can also communicate with the far end videoconferencing systems using wired and/or wireless communication links such as ISDN, Ethernet, Internet, cellular phone network, etc.

In contrast with traditional systems where multiple cameras are employed, the videoconferencing system 300 can have only a single camera 304. Camera 304 can be a high definition digital camera with super high resolution image sensor. The camera 304 can include an image sensor of various aspect ratios, e.g., aspect ratio of 32:9, 48:9, 64:9, or higher. The resolution of the camera 304 can be, e.g., 1080× (2×1920), 1080×(3×1920), 1080×(4×1920), or higher. In a 1080×(4×1920) embodiment, the image can have a 1080 line vertical resolution and 7680 pixels per line. This results in the camera 304 capturing a very wide aspect ratio image frame of the near end participants. The image sensor may be implemented as charged coupled devices (CCD), active-pixel sensors (APS), etc. The camera 304 can include a single image sensor for capturing images or can include multiple image sensors for separately measuring, red, green, and blue light that forms the incident image.

Camera 304 can also include a wide angle lens that allows the camera 304 to capture a wide angle view of the local conference room. For example, the wide angle camera lens can allow the camera 304 to capture a field of view of 100 degrees or more. As shown in FIG. 3, the camera 304 with the wide angle lens has a field of view 314 for capturing all the participants 302. With a large aspect ratio image sensor and a wide angle lens, camera 304 can provide high definition coverage of the local conference room. Alternatively, camera 304 can be equipped with a zoom lens that can allow the camera to dynamically alter the field of view 314. For example, such a zoom lens can allow the camera a field of view from around 100 degrees to 15 degrees. Camera 304 can also include auto focus capability and the associated servomechanism. Camera 304 can be mounted on a controllable servo camera mount, which can be controlled by a controller (controller shown in FIG. 4). The camera mount can allow the camera to pan in the horizontal direction and tilt in the vertical direction. For example, the camera 304 can pan left-right to around 90 degrees and tilt up-down to around 30 degrees.

The problems of misaligned images associated with multiple cameras can be mitigated by using a single, high resolution, wide angle camera 304. Portions of the video frame captured by camera 304 can be separately encoded and sent to the far end to be reproduced on far end display screens. As described in further detail below, when these separately encoded portions are decoded and displayed at the far end, no misalignment can be perceived.

Figure 4:
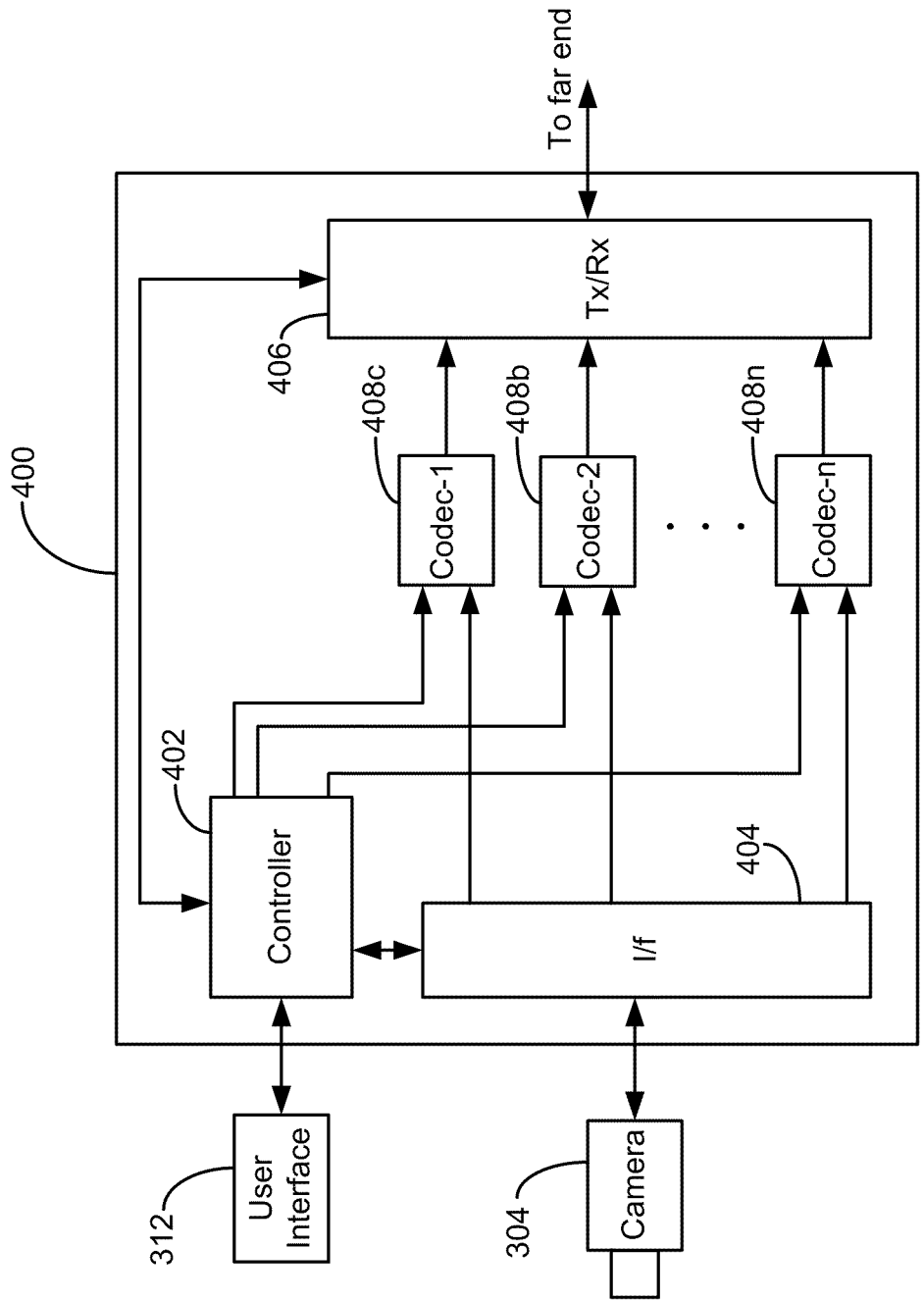
FIG. 4 shows an example of a functional block diagram of the encoding portion of a videoconferencing unit.

FIG. 4 illustrates an example of functional block diagram for a videoconferencing unit 400 within the videoconferencing system 300. The videoconferencing system 300 includes the super high resolution wide angle camera 304 described in relation with FIG. 3. Output signal of camera 304 can be transmitted to a videoconferencing unit 400 at interface 404. Interface 404 can be a dual link digital visual interface (DVI-DL) or multiple high definition multimedia interface (HDMI) that can receive a video stream from the camera 304, while also sending control signals to the camera 304. Alternatively, interface 404 can be an IEEE 1394 interface (i.e., FireWire), USB, or any other serial or parallel bus interface known in the art. Videoconferencing unit 400 can include one or more codecs 408a, 408b, . . . , 408n, each of which can receive the video stream from camera 304 via the interface 404. The codecs can compress or code the digital video stream received from the interface 404 for transmission via the transceiver 406. Additionally, the codecs can decompress or decode video data received from the far end via the transceiver 406 for display on display devices (not shown) at the near end. Codecs 408a-408n can be, for example, H.261, H.263, H.264, etc., however, other well known video codecs can also be used.

The videoconferencing unit 400 can be implemented in hardware or software or a combination of hardware-software. For example, the 400 can be implemented on an application specific integrated circuit (ASIC), a microcontroller/microprocessor, a field programmable gate array (FPGA), etc. Although controller 402 and the codecs 408a, 408b, . . . , 408n have been shown as separate modules, codecs 408a, 408b, . . . , 408n can each include capabilities of the controller 402. Although, the videoconferencing unit 400 is capable of processing both outgoing and incoming videoconferencing signals, FIG. 4 focuses mainly on the outgoing video signals to a far end conferencing system.

Controller 402 can control the operation of codecs 408a-408n, the camera 304 via interface 404 and the send/receive signals to/from the far end via transceiver 406. Typically, the controller 402 can provide configuration information to the codecs 408a-408n, control the orientation of camera 304 (using pan-tilt-zoom), and receive far end configuration information from the far end and send near end configuration information to the far end via transceiver 406. Controller 402 can also be coupled to a user interface 312, which allows near end conference participants to input display configuration for the display screens at the near end as well as the configuration of video content sent to the far end. Users can manually select the manner in which video content is displayed on the near end display screens or allow it to be automatically determined by the controller 402.

Figure 5:
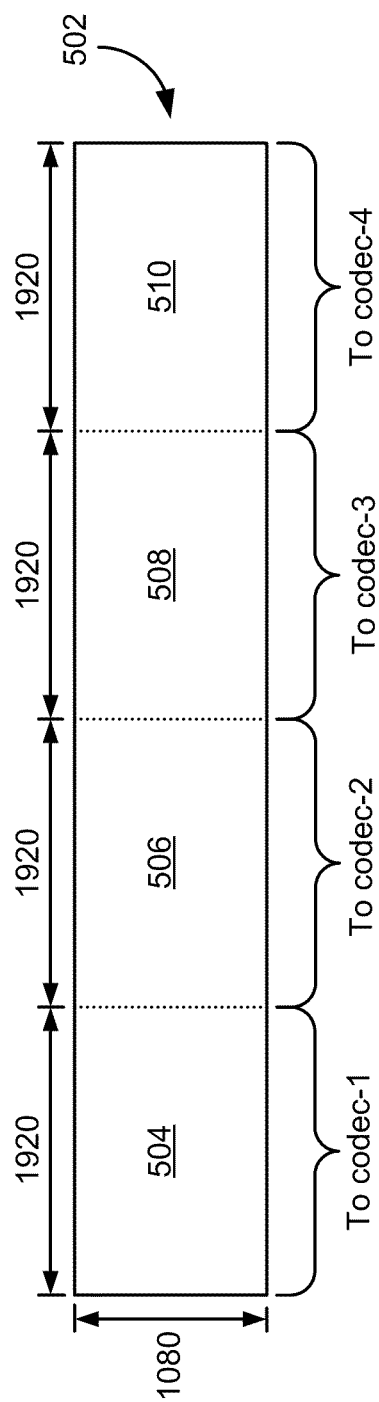
FIG. 5 illustrates an example of portions of a full frame image captured by a single camera being encoded by a plurality of codecs.

The controller 402 can determine how many codecs need to be employed based on, e.g., the far end configuration information. Alternatively, the videoconferencing unit 400 can have a fixed number of codecs irrespective of the far end videoconferencing setup. Each codec 408a-408n can receive the same video frame captured by the camera 304, select a portion of that video frame, and compress information corresponding only to the selected portion of the video frame. For example, FIG. 5 illustrates a quad-1080 video frame 502 that can be captured by the camera 304 and provided to each encoder 408a-408n. Also, for example, controller 402 can receive configuration information of the far end indicating that the far end includes four 1080 display screens. Controller 402 can then select four codecs, each codec instructed to select a 1080×1920 pixel, non-overlapping portion of the frame 502.

For example, FIG. 5 shows the first portion 504 can be selected for codec-1 (e.g., 408a), portion 506 can be selected for codec-2 (e.g., 408b), portion 508 can be selected for codec-3, and portion 510 can be selected for codec-4. Each codec can compress the video information contained within its respective portion of the frame 502 for transmission to the far end. The far end can receive, decompress, and display the portions 504-510 on four display screens. Typically, portions 504-510 are selected such that they are non-overlapping, adjacent, and aligned in a horizontal direction. In other words, each selected portion includes a unique set of pixels and that every row within a portion coincides with the same row in adjacent portions. For example, if the pixel at the bottom left corner of full frame 502 were to be given coordinate (1,1), and the pixel at the top right corner were to be given the coordinate (1080, 7860), then portion 504 will include pixels from (1,1) to (1080, 1920), portion 506 will include pixels from (1, 1921) to (1080, 3840), portion 508 will include pixels from (1, 3841) to (1080, 5760), and portion 510 will include pixels from (1, 5761) to (1080, 7860). Therefore, e.g., pixels row 10 in portion 504 will coincide with pixels in row 10 of portion 506, which in turn will coincide with row 10 of portion 508, and so on. However, even if same rows of adjacent portions do not perfectly coincide, or are shifted by a few pixels, the portions may be still considered to be aligned as long as the resulting misalignment of images displayed at the far end is imperceptible by the far end participants. For example, if adjacent portions overlap and/or are shifted by say 10 pixels, such portions may still be considered non-overlapping and aligned if the resultant artifacts in the reproduced images are too small to be detected by the far end participants; i.e., the far end participants will still perceive a seamless composite image.

Even if the camera position changes over time, as a consequence of movements in camera mount components due to vibrations expansion/contraction, physical contact by conference participants, etc., this change in camera position can have no effect on the relative alignment of the portions of the frame captured by each codec. This is because a change in camera position only changes the image captured by frame 502; relative positions of portions 504-510 do not change.

Figure 6:
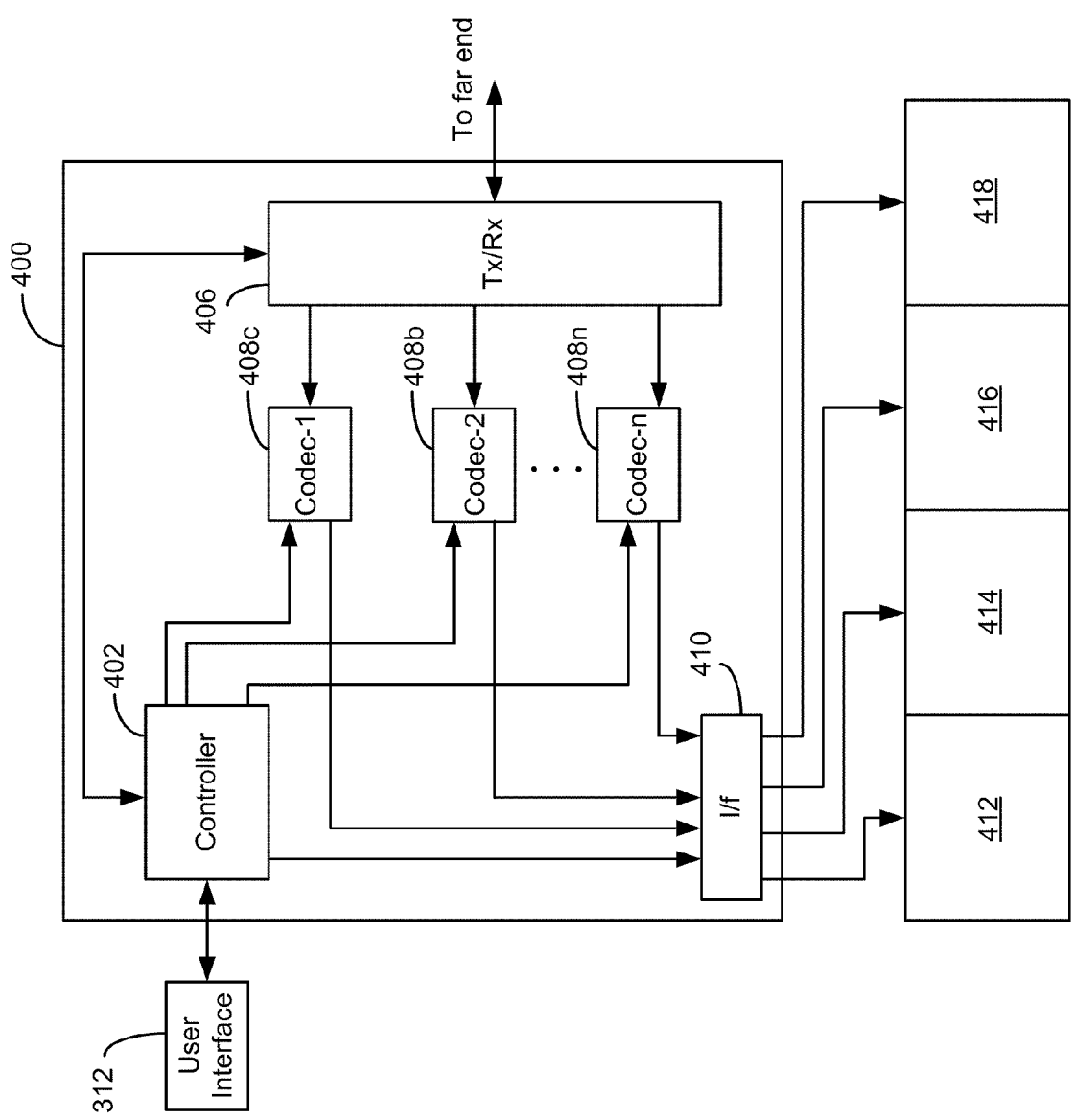
FIG. 6 shows and example of a functional block diagram of the decoding portion of the videoconferencing unit.

FIG. 6 illustrates an exemplary receiving portion of the videoconferencing unit 400. The near end can have four display devices 412, 414, 416, and 418. FIG. 6 can also represent the receiving portion of a far end videoconferencing unit. Display devices 412-418 can be arranged edge to edge so as to provide a seamless composite image to the conference participants. Each of the four display devices can receive video signals from a codec (e.g., codec-1 408a-codec-n 408n). Controller 402 can determine which of the display devices receive video streams from which of the codecs. This can depend upon the number of video streams being received form the far end. For example, if the videoconferencing unit 400 receives two video streams from the far end, then it can select the two center display devices 414 and 416 to display the received video streams from codec-1 and codec-2. As another example, the videoconferencing unit 400 can receive four video streams from a far end videoconferencing system having a videoconferencing unit similar to the one shown in FIG. 6; i.e., the far end videoconferencing unit generates four video streams from portions of a larger image frame captured by the far end camera. These four video streams can be decoded by codecs 1-4 and displayed on display devices 412-418. Preferably, display devices 412, 414, 416, and 418 will be spatially aligned in such a manner that any row of pixels displayed on one display screen can coincide with the same row of pixels in the adjacent display screen(s). However, some misalignment can be tolerated when the magnitude of misalignment is imperceptible to the conference participants viewing the display screens.

Figure 7:
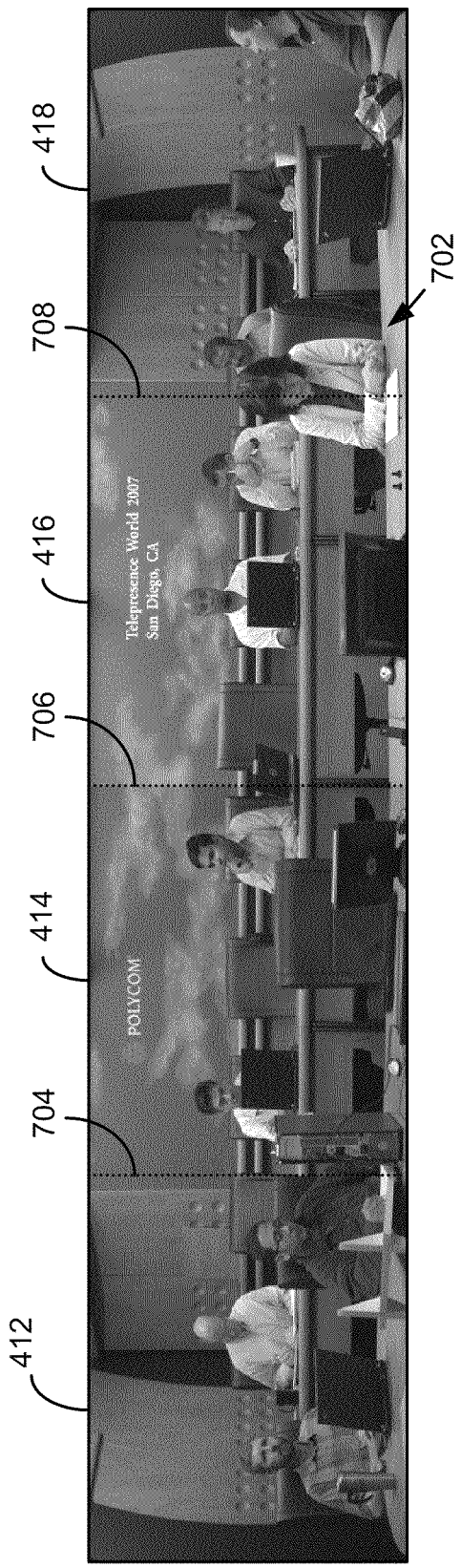
FIG. 7 shows an example of a seamless composite image formed by images displayed on display devices of FIG. 6.

FIG. 7 illustrates an exemplary image displayed on display devices 412-418. Broken lines 704, 706, 708 denote display device boundaries. As can be seen, objects near the edge of one display device seamlessly align with the image of the same object near edge of the adjacent display device. For example, image of participant 702, whose complete image is formed by adjacently displayed images on display device 412 and 418, is accurately displayed without any perceived misalignment. Furthermore, the problem of color matching that plagued systems receiving video streams from separate cameras can also be mitigated. Because the images are generated from portions of a frame captured by a single camera, images generated from each portion will be color matched. These aligned and color matched images displayed at the far end greatly enhance the telepresence experience.

The number and size of the portions determined by the controller 402 need not be constant. That is, the controller 402 can determine these parameters based on the configuration of the far end conferencing system. The following discussion describes altering configuration of the near end conferencing system based on configuration information received from the far end conferencing system. This configuration information can include the number of video displays, the aspect ratio of the video displays, the number, position, and type of video cameras, aspect ratio of the video cameras, etc. Both near end and far end videoconferencing systems can utilize the exchanged configuration parameters to modify the audiovideo signal before it is transmitted to the other end. Configuration parameters can be communicated to the other end using signaling protocols, e.g. H.225.

For example, the near end videoconference system can communicate with a far end videoconferencing system having only two display devices. In such cases, referring to FIG. 4, the controller 402 can receive configuration information indicating that the far end videoconferencing system has only two display devices, where each display device has an aspect ratio of 16:9 and resolution of 1080×1920. In response, the controller 402 can select only two codecs from codec-1 408a-codec-n 408n. For example, referring to FIG. 5, the controller 402 can select codec-2 and codec-3 that capture portions 506 and 508. Alternatively, controller 402 may select combination of any two codecs that capture adjacent portions of the frame 502.

In some situations, selecting portions 506 and 508 of frame 502 for transmission to the far end may result in participants in portions 504 and 510 not being captured. In such cases, the controller can send a command to the camera 304 via the interface 404 to zoom out so that all the participants can be captured within the portions 506 and 508. In other situations, there may be only a few participants clustered close together within the portions 506 and 508. In such cases, the controller 402 can send a command to the camera 304 to zoom in, so that the participants can fill the image area captured by portions 506 and 508. Controller 402 can also control the camera 304 to pan or tilt in order to optimally capture near end participants.

Determining whether the near end participants can be captured by the selected portions can be determined by the controller in several ways. In one instance, the controller can utilize face pattern recognition technique to determine the locations of the participants within the conference room. For example, in one technique, the controller can use algorithms for face detection within each frame 502 captured by the camera 304. Face detection algorithms can localize faces within an input image. Typically, a face detection system can include a set of classifiers that have been previously trained (using learning methods such as neural networks, etc.) to classify the input pattern associated with features such as a face or a non-face. A fixed size window can scan every location within an image and extract image patterns that can be passed through classifiers to check for existence of a face. Once a face is recognized, the regions in the image where the face exists can be determined. In this manner, controller 402 can determine the locations of participants within the frame 502 captured by camera 304. This process is shown by way of example in FIGS. 8A and 8B.

Figure 8A:
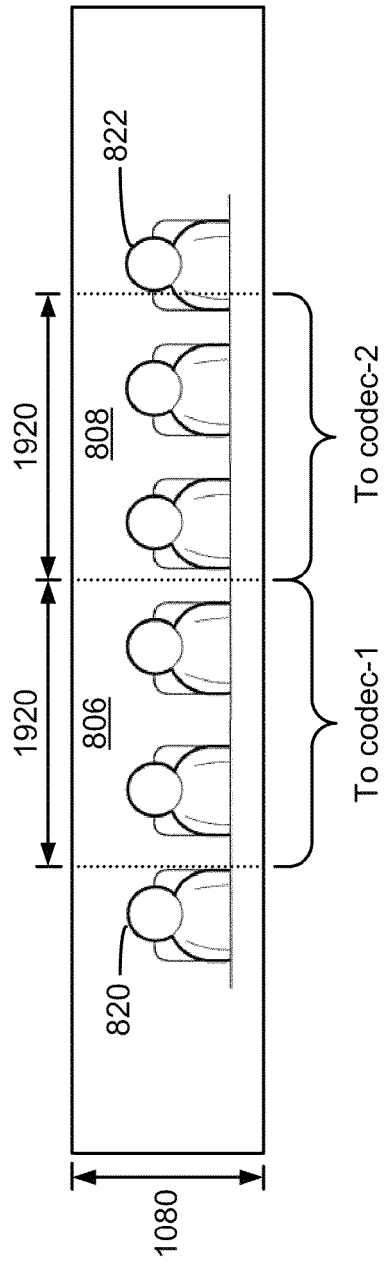
FIGS. 8A and 8B show an example where the videoconferencing unit adjusts the camera in order to capture all the near end participants within the selected portions of the full frame.
Figure 8B:
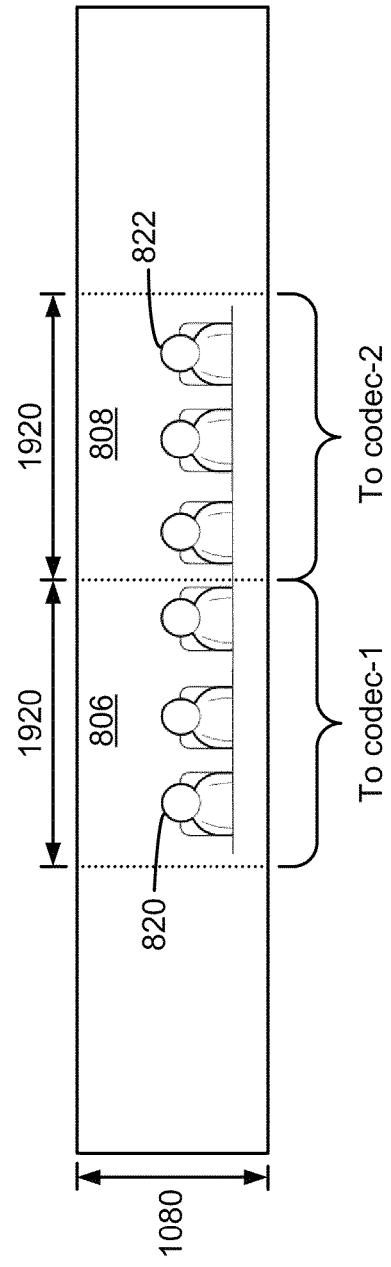

FIGS. 8A and 8B illustrate an example, in which the videoconferencing unit 400 is communicating with a far end videoconferencing system that has two display screens. Controller 402 can select codec-1 and codec-2 to generate two video streams. Additionally, controller 402 can select two adjacent 1080×1920 portions 806 and 808 from substantially middle of the frame 502. Note that the two portions 806 and 808 can be selected from anywhere within the frame 502, e.g., far right, far left, etc. Controller 402 can execute the face detection algorithm, as previously described, to determine the positions of the near end participants. Once the positions of the near end participants within the frame 502 are known, these positions are compared to the selected portions 806 and 807. As can be seen from FIG. 8A, images of near end participants 820 and 822 lie outside the part of the frame 502 encompassed by portions 806 and 808. Controller 402 can control the camera 304 to zoom out so that all the near end participant images can be encompassed within the selected portions 806 and 808. This can be achieved by periodically comparing the width of the combined portions 806 and 808 with the distance between the images of the farthest near end participants' faces while zooming out. The controller 402 can also pan or tilt the camera so that the near end participants' images can be positioned substantially in the center of the portions 806 and 808. As shown in FIG. 8B, images of all near end participants are now encompassed within the selected portions 806 and 808 of frame 502. Codec-1 and codec-2 can now encode the portions 806 and 808, respectively, for transmission to the far end. Similarly, the camera can be zoomed in, i.e., its field of view reduced, so that the participant images adequately fill out the cumulative area of portions 806 and 808.

Figure 9:
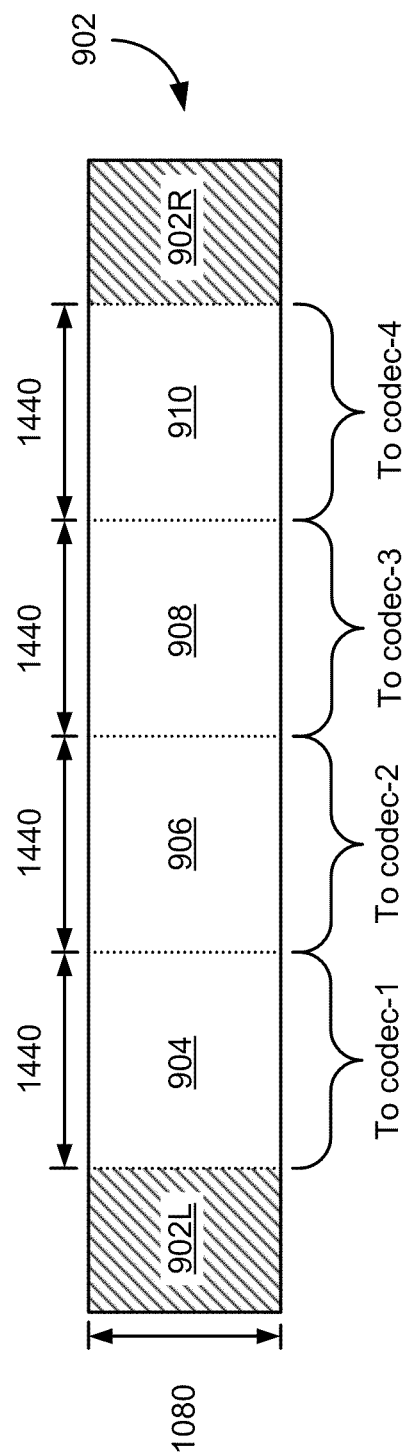
FIG. 9 illustrates an example where the videoconferencing unit encodes portions based on configuration information of the far end.

The size of portions that each codec captures can also be varied based on far end configuration parameters. For example, the far end videoconferencing unit can have display devices with aspect ratio of 4:3, which is different from the 16:9 aspect ratio captured by the codecs in FIG. 5. In such cases, the controller 402 can select only 1440 horizontal pixels instead of 1920. Note that codecs, e.g., MPEG2, MPEG4, etc, provide various encoding profiles and levels, which allow the controller 402 to select various aspects of the encoding, including the aspect ratio. For example, FIG. 9 illustrates four portions 904, 906, 908, and 910, each with an aspect ratio of 4:3, that can be captured and encoded from frame 502. Certain area of the frame may be discarded, i.e., not encoded by any codec. These discarded portions are denoted by portions 902L and 902R. The location of portions 904-910 can also be at the leftmost position within the frame 502, resulting in the discarded portion appearing on the right end of frame 502. Similarly, location of portions 904-910 can be at the rightmost position or anywhere in between.

A person skilled in the art will appreciate that the videoconferencing unit 400 can select various other sizes of portions from the full frame 502. In some instances, the exact sizes of the portions to be sent to the far end can be received directly from the far end itself via configuration information. In other instances, the videoconferencing unit 400 may only receive the identity of the far end system, and the controller 402 can determine the exact number and sizes of the portions based on information stored in memory corresponding to the received identity of the far end system. For example, if the controller receives information that the far end system is a POLYCOM® TPX™ 306 series system, controller can lookup previously stored information corresponding to the entry POLYCOM® TPX™ 306 indicating that the far end system has 3 display screens each with an aspect ratio of 16:9 and 1080×1920 pixels. Alternatively, the controller can receive such information from the near end participants via user interface 312. Subsequently, the controller 402 can select three portions, each with aspect ratio 16:9 and having 1080× 1920 pixels, of the full frame 502 for encoding.

Figure 10:
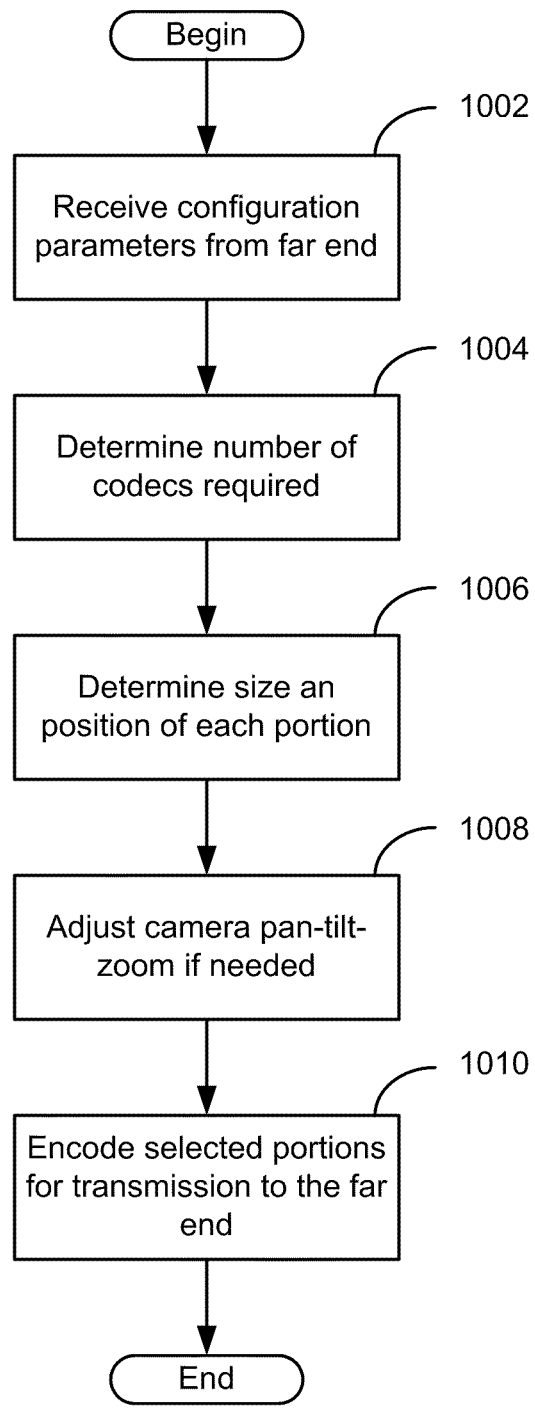
FIG. 10 shows an exemplary flowchart depicting the operations of the videoconferencing system.

FIG. 10 illustrates an exemplary flowchart describing the functioning of one aspect of a near end videoconferencing unit. In step 1002, the near end videoconferencing unit can receive configuration parameters from the far end videoconferencing unit. As discussed previously, configuration parameters can include the number of video displays, the aspect ratio of the video displays, the number, position, and type of video cameras, aspect ratio of the video cameras, etc. For example, the near end videoconferencing unit can receive information that the far end videoconferencing unit includes two display devices, each having an aspect ratio of 16:9. Based on the configuration parameters of the far end videoconferencing unit, the near end videoconferencing unit, in step 1004, can determine the number of codecs required to encode images of the near end participants. For example, if the far end has two display devices, two codecs can be selected, as was discussed previously with respect to FIG. 10. In step 1006, the near end videoconferencing unit can determine the position and size of the portions of the full image frame that will be encoded by the selected codecs. For example, four adjacent portions, each of aspect ratio 16:9 and size 1080×1920, can be selected for encoding by four codecs (e.g., as in FIG. 5). As another example, four adjacent portions, each of aspect ratio 4:3 and size 1080×1440, can be selected. Of course, other sizes for the same aspect ratio can also be selected, e.g., 720×1280 for a 16:9 aspect ratio.

In step 1008, the near end videoconferencing unit can adjust the orientation of the camera based on the positions of the near end participants and the coverage of the selected portions of the full image. For example, the camera can be zoomed out so as to encompass all the near end participants within two selected portions, as shown in FIGS. 8A and 8B. The camera can also be zoomed out, panned, and tilted to appropriately capture images of near end participants. In step 1010, each of the selected portions can be encoded and sent to the far end. The encoding scheme or algorithm employed can be based on information in the configuration parameters received from the far end. For example, if the far end requires the video streams to be encoded using H.264, then the near end videoconferencing can select a compatible codec appropriately.

Videoconferencing unit 400 can include volatile memory such as RAM and non-volatile memory such as ROM, Flash, EPROM, etc. for storing instructions to carry out the operations described in FIG. 10. These memories can also store data and drivers related to cameras, display devices, and user interfaces, codecs, tranceivers, etc. Additionally, configuration information related to various far end videoconferencing units can also be stored in memory.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A method for video conferencing between a near end conference unit, the near end conferencing unit comprising a controller, a wide-aspect ratio camera, one or more codecs, and a transceiver, and a far end conference unit, the method comprising:
   capturing a wide aspect ratio video frame using the wide-aspect ratio camera;
   accessing configuration information of the far end conferencing unit by the controller, the configuration information including a number of display devices at the far end conference unit;
   selecting, by the controller, a plurality of adjacent, non-overlapping, and horizontally aligned portions of the captured wide aspect ratio video frame, the number of plurality of portions being equal to the number of display devices at the far end conference unit;
   adjusting wide-aspect ratio camera controls, by the controller, such that a required number of near end participants are encompassed within the selected plurality of portions;
   encoding, by the one or more codecs, each of the plurality of portions into a separate encoded data stream; and
   transmitting, by the transceiver, the plurality of separate encoded data streams to the far end conference unit.

2. The method of claim 1, wherein the aspect ratio of the captured wide aspect ratio video frame is 64×9.

3. The method of claim 1, wherein the configuration information includes an aspect ratio of at least one far end display device.

4. The method of claim 3, wherein aspect ratio of at least one of the plurality of portions is equal to the aspect ratio of the at least one of the far end display device.

5. The method of claim 1, wherein accessing the configuration information comprises the controller receiving the configuration information from the far end conference unit via the transceiver.

6. The method of claim 1, wherein the required number of near end participants to be captured is determined by the contoller based on face recognition.

7. A method for video conferencing between a near end conference unit, the near end conferencing unit comprising a controller, a wide-aspect ratio camera, one or more codecs, and a transceiver, and a far end conference unit, the method comprising:
   capturing a wide aspect ratio video frame using the wide-aspect ratio camera;
   selecting, by the controller, a plurality of portions of the captured wide aspect ratio video frame;
   adjusting wide-aspect ratio camera controls, by the controller, such that a required number of near end participants are encompassed within the selected plurality of portions;
   encoding, by the one more codecs, each of the plurality of portions into a separate encoded data stream; and
   transmitting, by the transceiver, the plurality of separate encoded data streams to the far end conference unit.

8. The method of claim 7, wherein the aspect ratio of the captured wide aspect ratio video frame is at least 64×9.

9. The method of claim 7, wherein the plurality of portions are adjacent, non-overlapping, and horizontally aligned.

10. The method of claim 7, further comprising receiving configuration information pertaining to the far end conference unit by the controller.

11. The method of claim 10, wherein the configuration information includes a number of display devices at the far end conference unit.

12. The method of claim 11, wherein the number of plurality of portions is equal to the number of far end display devices.

13. The method of claim 10, wherein the configuration information includes an aspect ratio of at least one far end display device.

14. The method of claim 13, wherein aspect ratio of at least one of the plurality of portions is equal to the aspect ratio of the at least one far end display device.

15. The method of claim 10, wherein the configuration information is received from the far end conference unit via the transceiver.

16. The method of claim 10, wherein the configuration information is received from a user interface at the near end conference unit.

17. The method of claim 11, wherein the required number of near end participants to be captured is determined by the controller based on face recognition.

18. A near end videoconferencing unit is configured to communicate with a far end videoconferencing unit, comprising:
   a wide aspect ratio video camera for capturing a wide aspect ratio video frame;
   a plurality of codecs coupled to the wide aspect ratio video camera so as to receive the wide aspect ratio video frame from the wide aspect ratio video camera, each codec encoding one of a plurality of portions of the wide aspect ratio video frame to generate a separate encoded data stream; and
   a transceiver, coupled to the plurality of codecs, so as to receive the separate encoded data streams from the plurality of codecs and transmit the plurality of separate encoded data streams to the far end conferencing unit; and a controller coupled to the interface, the plurality of codecs, the wide aspect ratio video camera and the transceiver, wherein the controller:

receives configuration information of the far end video conferencing unit via the transceiver;

selects the plurality of portions of the wide aspect ratio video frame based on the received configuration information; and adjusts the wide aspect ratio video camera controls such that a required number of near end participants are encompassed within the selected plurality of portions.

19. The videoconferencing unit of claim 18, wherein an aspect ratio of the wide aspect ratio video frame is at least 64×9.

20. The videoconferencing unit of claim 18, wherein the camera has a field of view of at least 100 degrees.

21. The videoconferencing unit of claim 18, wherein the plurality of portions are adjacent, non-overlapping, and horizontally aligned.

22. The videoconferencing unit of claim 18, wherein the configuration information includes a number of display devices at the far end videoconferencing unit.

23. The videoconferencing unit of claim 22, wherein the controller selects a number of plurality of portions to be equal to the number of display devices at the far end videoconferencing unit.

24. The videoconferencing unit of claim 18, wherein the configuration information includes an aspect ratio of at least one display device at the far end videoconferencing unit.

25. The videoconferencing unit of claim 24, wherein the controller selects an aspect ratio of at least one of the plurality of portions to be equal to the aspect ratio of the at least one display device at the far end videoconferencing unit.

26. The videoconferencing unit of claim 18, wherein the configuration information is received from the far end videoconferencing unit.

27. The videoconferencing unit of claim 18, wherein the configuration information is received from a near end user interface coupled to the controller.

28. The videoconferencing unit of claim 18, wherein the required number of near end participants to be encompassed is determined based on face recognition.

* * * * *